UNITED STATES PATENT OFFICE.

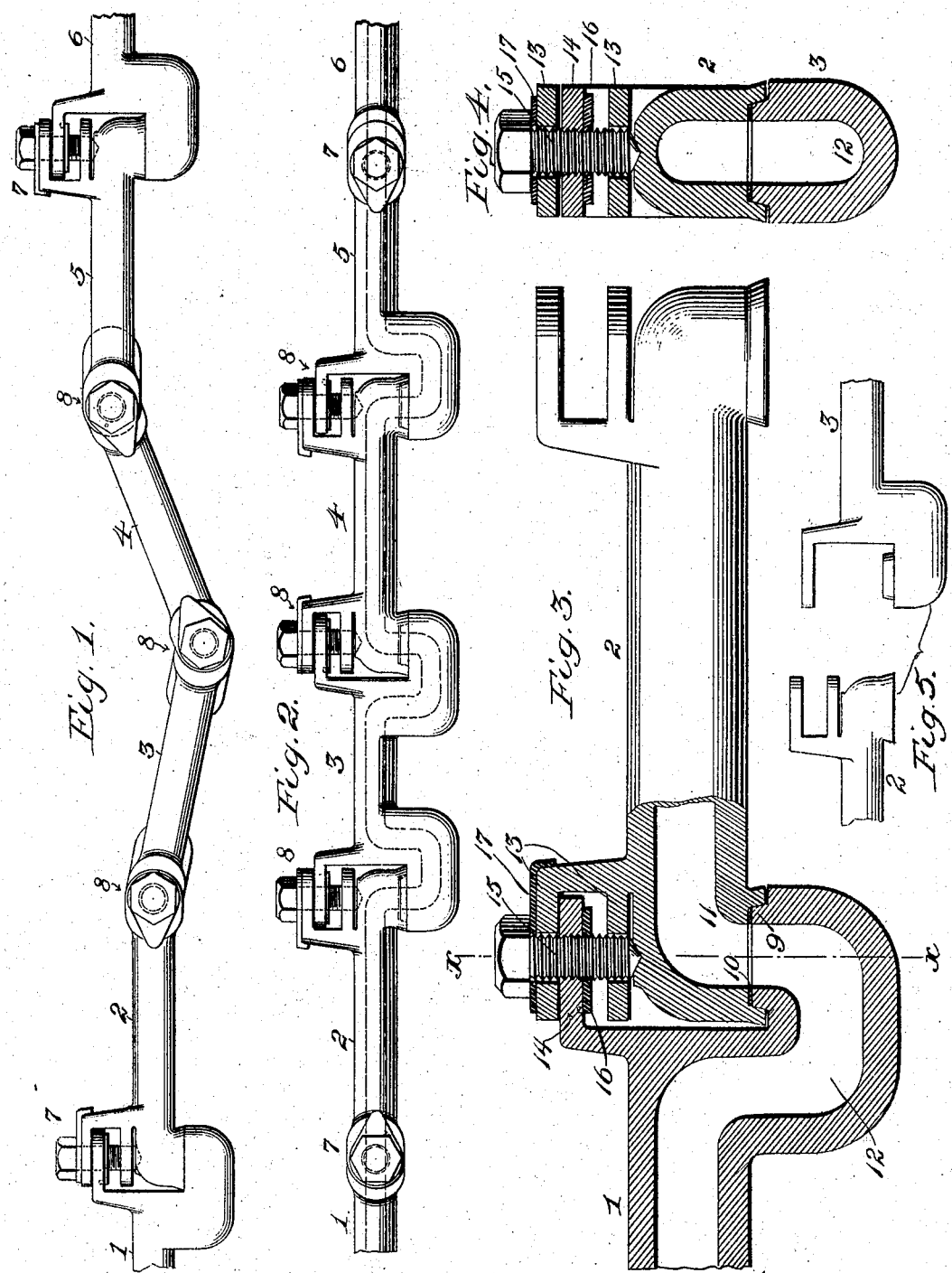

JORDAN H. GREEN, OF JACKSON, MICHIGAN, ASSIGNOR OF ONE-HALF TO DANIEL P. SAGENDORPH, OF JACKSON, MICHIGAN.

TRAIN-PIPE CONNECTION.

No. 806,134.   Specification of Letters Patent.   Patented Dec. 5, 1905.

Application filed October 12, 1904. Serial No. 228,143.

*To all whom it may concern:*

Be it known that I, JORDAN H. GREEN, a citizen of the United States, residing at Jackson, in the county of Jackson and State of Michigan, have invented certain new and useful Improvements in Train-Pipe Connections; and I do hereby declare the following to be a full, clear, and exact description of the invention, such as will enable others skilled in the art to which it appertains to make and use the same.

This invention relates to train-pipe connections adapted for use in the air-brake and heating systems of railway-cars for coupling the air, steam, or water supply pipes of the engine with those of the train or for coupling the pipes of adjacent cars. This is usually done by flexible tubing, which, especially that made of india-rubber, on account of its tendency through constant pumping, handling, and freezing to crack and its liability to puncture, rapidly deteriorates and in time becomes unsafe, so that in the brake system especially the air-brakes are ever liable to failure, which is a frequent cause of accident. Flexible metallic connections have hitherto been devised; but so far as I am aware they have not come into use by reason of impracticable arrangements of pipe-sections and unsatisfactory constructions of the joints.

The main object of this invention is to furnish an efficient and practicable metallic flexible connection, perfectly compensating for the lateral motion, tensile strain, and slack due to variations in the travel of the cars and forming a durable, effectively-sealed connection, so that the whole line of supply-pipe running from the engine and throughout the train shall be of metal, thus minimizing liability to accident in operating the air-brakes.

Other objects are to arrange the intermediate pipe-sections in the same plane, to preserve a continuous uninterrupted conduit through the piping, to avoid internal fastenings at the joints, which would reduce the space, be subject to the deteriorating influences of the fluid medium, and also subject to the general objection of inconvenience, and to provide an effective, practicable, and conveniently-manipulative joint.

A preferred manner of construction and application of my device is substantially as shown in the accompanying drawings, which form a part of this specification, and wherein—

Figure 1 represents a side elevation of a complete pipe connection as interposed between the engine and train or between two cars, the four oscillating pipe-sections herein shown being an appropriate number to carry out my invention in coupling two cars for effective operation, although, as will be readily understood, my invention being adapted to various uses the number of sections and joints may be varied at will. Fig. 2 represents a plan of the same. Fig. 3 is an enlarged detail view of one pipe-section, showing its pivotal joint to another pipe-section in longitudinal section. Fig. 4 is a cross-section on the line $x$ $x$ of Fig. 3. Fig. 5 is a detail view of the two members of a pipe-joint when separated.

1 and 6 designate the adjacent terminals of two train-pipes, which are connected by a set of pipe-sections 2 3 4 5, of which the end sections 2 and 5 oscillate horizontally, while the intermediate sections 3 and 4 oscillate vertically, thus making the adjustment universal.

7 7 denote the joints or couplings between pipes 1 2 and 5 6, which may be joints of my present improved construction or may be any approved couplings already in use adapted to allow free swinging or oscillation of the pipe-sections 2 and 5 in horizontally-disposed planes or at right angles to the plane of oscillation of the intermediate pipe-sections, which are coupled by the joints 8 8 8.

All the joints or couplings are herein represented of like construction, so that a description of one will suffice, reference being had particularly to Figs. 3, 4, and 5. The contiguous ends of adjacent pipe-sections are formed with turns, elbow-bends, or offsets seated together, as at 9, so as to provide a fluid-tight pivotal or swivel joint, in which a packing-ring or gasket 10 may advantageously be fitted to insure perfect contact by its elasticity and secure perfect sealing of the joint. One of said pipe-sections has preferably a short quarter-turn 11 and the other a double turn or return-bend 12 pivotally seated together, as aforesaid, thus maintaining the conduit through the pipe-sections in a continuous line except at the joint and allowing relative oscillation of the pipe-sections in the same plane. The said contiguous ends of the pipe-sections have projecting therefrom wings or ledges, one pipe having preferably two of such wings 13 and the other an intervening wing 14, all parallel with the seat 9, and through these wings is inserted a screw-bolt 15, coaxial with the pivotal joint or seat 9, said screw-bolt being tapped or threaded through the intermediate wing 14 and having an easy sliding fit through holes in the two wings 13. This screw-bolt bears pivotally upon the pipe-section having the wings 13 coaxially with the seat 9, and thus compresses and confines the joint, as shown, the pressure being given by turning it in the threaded wing 14 of the other member in an obvious manner. Constant and reliable pressure of the screw-bolt may be maintained by means of a lock-nut 16, tapped on the threaded part of the bolt against the wing 13. Thus while a perfectly-sealed joint is obtained free swinging movement or oscillation between the two pipe-sections is permitted, since the wings 13 have only a loose fit on the screw-bolt. A washer 17 may be introduced between the outermost wing 13 and the head of the screw-bolt 15. When the several pipe-sections are thus secured together, the lateral motion of the cars is compensated for by the end members 2 and 5, which oscillate in a horizontal plane, and the vertical motion by the other members, which oscillate in a vertical plane, while the tensile strain, take-up, and slack due to going around curves or other variations in movements of the cars are compensated for by the two or more intermediate pipe-sections, the whole having always sufficient slack so that the connection cannot be drawn out into a straight line.

It will be observed that the construction described avoids internal fastenings at the pipe-joints and provides a very simple, effective, practicable, and conveniently-manipulative connection external to the pivotal seat between the pipe-sections. The usual bulbous enlargements at the joints for accommodating the fastenings are obviated, and the fastenings are not disposed to the action of the medium flowing through the pipes. The conduit runs in a continuous line through the piping except at the joints, where the conduit runs in U-shaped bend.

My invention is of course applicable to any apparatus where a flexible metallic pipe connection is desired and is susceptible of variations in form and specific details of construction.

I claim as my invention and desire to secure by Letters Patent of the United States—

1. A flexible metallic train-pipe connection comprising a plurality of jointed pipe-sections, the contiguous ends of adjacent pipe-sections having bends seated together to form a fluid-tight pivotal joint, and said sections having overlapping wings through which a screw-bolt is inserted coaxially with said joint and tapped through the wing of one section and loosely inserted through the wing or wings of the other and bearing pivotally against said other section, substantially as described.

2. A flexible metallic train-pipe connection having, in combination, a plurality of jointed pipe-sections, contiguous ends of adjacent sections having one a quarter-turn and the other a return-bend seated together to form a fluid-tight pivotal joint, and said sections having overlapping wings through which a screw-bolt is inserted coaxially with said joint, said screw-bolt being loose in the wing of one section and having its point pivotally bearing against said section and having its threaded part tapped through the wing of the other section, substantially as described.

3. A metallic train-pipe connection comprising, in combination, a plurality of jointed pipe-sections, the terminal joints of which allow oscillation about vertical axes, while the intermediate joints allow oscillation about horizontal axes, each joint swiveled and turning on a pivot-pin concentric with and perpendicular to the plane of connection and supported and held by interfitting ledges or wings on the pipe-section, substantially as described.

4. A flexible metallic train-pipe connection consisting of a series of jointed pipe-sections, adjacent sections having curved corresponding ends pivotally seated, forming a U-shaped internal passage, said ends being held in contact by a set-screw passing through projecting wings or ledges on the pipe-sections, opposite said pivotal seat, a wing of one member being threaded and adapted to engage said set-screw which bears on the second member concentrically with and perpendicularly to the plane of connection, substantially as described.

5. A flexible metallic train-pipe connection comprising a plurality of jointed pipe-sections whose contiguous ends are seated together to form a pivotal joint, allowing relative oscillation or flexure of the pipe-sections, and means external to the piping holding said ends to their pivotal seat, said means comprising overlapping wings or ledges projecting from said sections, and a screw inserted loosely through the outer wing on one section and tapped through the inner wing on the other section and bearing pivotally against the latter section coaxially with said joint.

In testimony whereof I affix my signature in presence of two witnesses.

JORDAN H. GREEN.

Witnesses:
 JOHN WHITNEY,
 W. K. SAGENDORPH.